United States Patent [19]

Level et al.

[11] 4,249,645
[45] Feb. 10, 1981

[54] PROTECTING DEVICE IN PARTICULAR FOR A ROD OF A TELESCOPIC SHOCKABSORBER

[75] Inventors: Jean-Paul Level, Belfort; Guy Buffard, Montbeliard, both of France

[73] Assignees: Automobiles Peugeot; Societe Anonyme Automobiles Citroen, both of Paris, France

[21] Appl. No.: 38,427

[22] Filed: May 14, 1979

[30] Foreign Application Priority Data

May 29, 1978 [FR] France .................. 78 15931

[51] Int. Cl.³ .......................................... F16F 9/38
[52] U.S. Cl. ................................. 188/322; 188/1 C; 267/8 R
[58] Field of Search ............ 188/322, 1 C; 267/64 B, 267/65 B, 181, 34, 8 R; 74/492; 280/696, 701

[56] References Cited

U.S. PATENT DOCUMENTS

| 3,470,761 | 10/1969 | Okamoto et al. | 74/492 |
| 3,492,888 | 2/1970 | Nishimura et al. | 188/1 C X |
| 3,850,049 | 11/1974 | Adams et al. | 74/492 |
| 4,042,259 | 8/1977 | Fiedler et al. | 280/701 |

FOREIGN PATENT DOCUMENTS

| 214917 | 5/1956 | Australia | 188/322 |
| 883169 | 10/1971 | Canada | 267/34 |
| 2006028 | 12/1969 | France | 188/322 |

Primary Examiner—George E. A. Halvosa
Attorney, Agent, or Firm—Burns, Doane, Swecker & Mathis

[57] ABSTRACT

The device is very simple but effective and comprises a tube or sleeve of flexible elastomer fixed to a cup which is rigid with the rod of the shockabsorber. This sleeve has at least one series of slits which extend in a direction parallel to the generatrices of the sleeve and its free edge is in the vicinity of a bearing surface so that, in the course of a relative displacement between the rod and the body toward the position of maximum depression of the rod, the sleeve is deformed in a region in which the rod is however protected by the body or by a conventional protecting gaiter.

8 Claims, 4 Drawing Figures

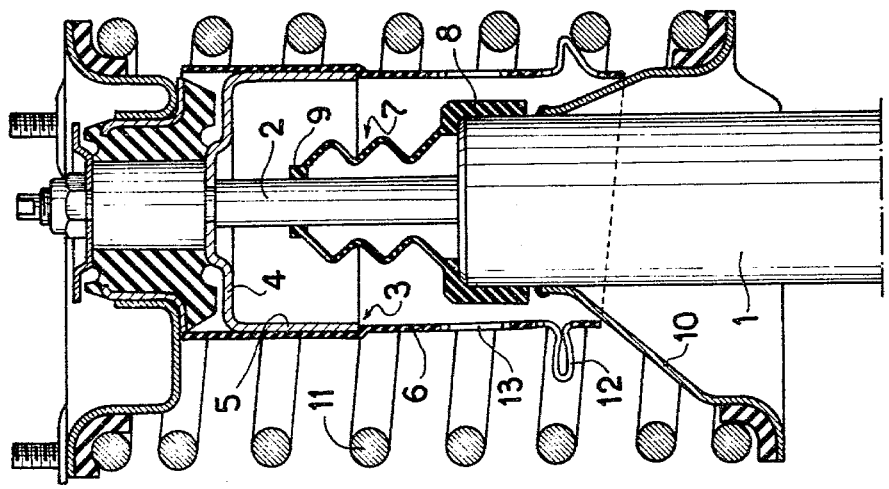
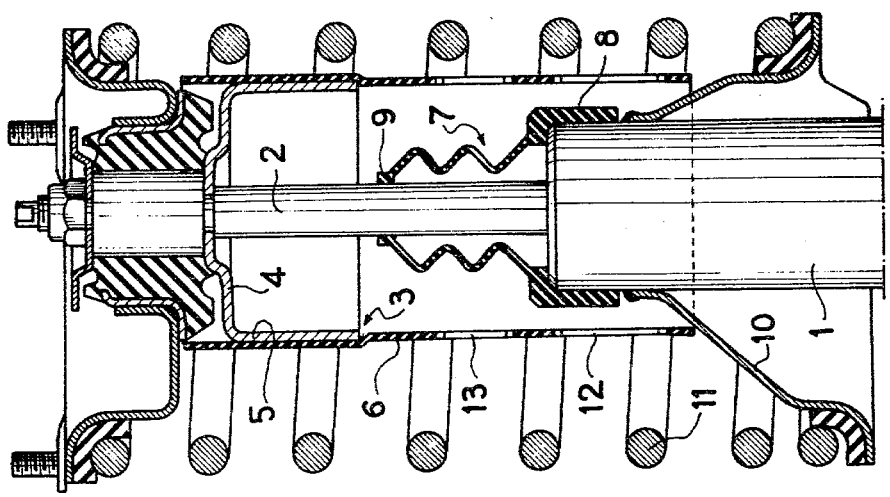

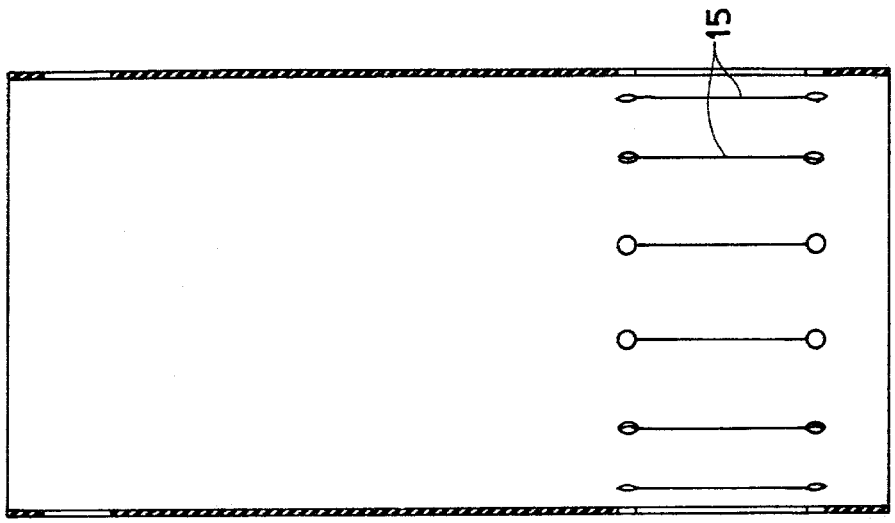
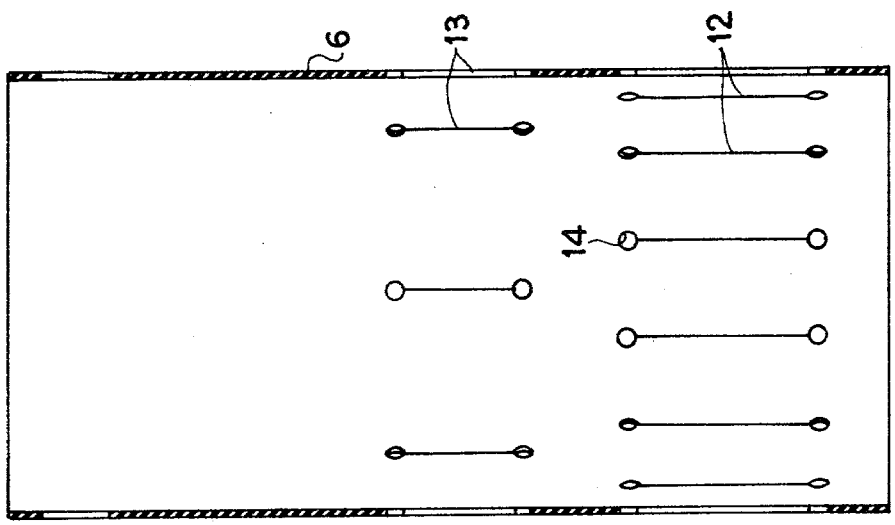

PROTECTING DEVICE IN PARTICULAR FOR A ROD OF A TELESCOPIC SHOCKABSORBER

The present invention relates to devices for protecting or shielding sliding members such as rods of telescopic shockabsorbers.

In such a telescopic shockabsorber the rod extends out of the body a variable distance and the protectors or shields usually employed, which are fixed to the end of the body through which the rod extends, do not protect the entire length of the rod since it would be impossible to find room for them in the innermost position of the rod. Consequently, this rod receives projections of water, mud, sand etc. which corrode it and result in a higher friction of the rod in its bearing at the entrance of the body of the shockabsorber and there is a risk of escape of the liquid in the region of this bearing.

This situation may be encountered in other applications, and the object of the invention is to provide a device which affords a more effective protection of the sliding member by simple means.

According to the invention, there is provided a device for shielding a rod of a telescopic shockabsorber or other member slidable in a bearing, said device comprising a tube or sleeve of an elastomer fixed at a first end on the slidable member and comprising, in the vicinity of the free opposite end thereof, at least one series of slits which are spaced apart around the periphery of the tube and are oriented roughly on generatrices of the tube, the free edge of the tube being adapted to cooperate with a surface defined by means rigid with the bearing, in the course of the relative displacement of the rod and the bearing in the direction toward each other, whereby the tube is deformed in the region thereof in which the slits are provided.

According to one embodiment, the tube of elastomer comprises two series of slits which are axially offset with respect to each other and arranged in such manner that the tube is deformed first in the region in which the series of slits which are the nearest to the free end of the tube are provided.

For this purpose, the number of slits of the series the nearest to the free end may exceed the number of slits of the other series and the lengths of the slits of the first-mentioned series may be greater than the length of the slits of the second series.

In the application of the invention to a telescopic shockabsorber, the inside diameter of the tube is chosen to be greater than the outside diameter of the body of the shockabsorber and the free edge of the tube comes in contact with a member which is rigid with the body.

The invention will be described in more detail hereinafter, with reference to the accompanying drawings which are given merely by way of example and in which:

FIG. 1 is a longitudinal sectional view of a telescopic shockabsorber comprising a shield according to the invention in its mean position;

FIG. 2 is a view of the same shockabsorber after the beginning of the displacement towards its shockabsorbing position;

FIG. 3 is an axial sectional view of a shielding tube or sleeve having two series of slits, and FIG. 4 is an axial sectional view of a tube or sleeve having a single series of slits.

FIG. 1 shows the upper end of a unit in the form of a shockabsorber for an automobile vehicle comprising a body 1 and a slidable member or rod 2. The rod 2 is connected in its upper part by known means to the suspended part of the vehicle and it carries in particular a cup 3 having an inner end wall 4 and a cylindrical portion 5, the wall 4 cooperating with an abutment of elastomer whereas the cylindrical skirt portion acts as a support for a protecting or shielding sleeve 6 according to the invention of flexible elastomer.

The rod is guided in the body by a bearing (not shown) and is protected in the vicinity of the region in which it enters the body by a bellows or gaiter 7 of elastomer which is fixed by one end portion 8 to the body and is in contact by its other end portion 9 with the rod 2. The body 1 and the gaiter 7 form a structure which encloses a portion of the rod 2 whereas another portion of the rod extends out of this structure and needs to be shielded. This is the purpose of the sleeve 6.

The tube or sleeve 6 is fitted and held in position by any suitable means on the cylindrical skirt portion 5 and extends to the region of a cup 10 which is fixed to the body of the shockabsorber and also acts as a support surface for a spring 11. The diameter of the tube 6 is therefore between the diameter of the body 1 and the inside diameter of the spring 11.

In the presently-described embodiment, the sleeve or tube 6 has two series of slits 12, 13, the slits of each series being spaced apart around the periphery of the tube and the various slits extending in a direction parallel to the generatrices of the tube. The slits of one series are located between two planes perpendicular to the axis of a tube.

FIG. 3 shows the arrangement of the slits of each series and it will be noted that the slits 12 are longer and larger in number than the slits 13. Thus, in one embodiment, there may be provided fourteen slits 12 and eight slits 13. These slits are preferably formed by cuts having adjoining lips which terminate in round orifices 14.

The operation of such a device is particularly simple. In the mid-way position shown in FIG. 1, the lips of the slits are in adjoining relation and the sleeve 6 protects the whole of the part of the rod located above the gaiter 7 whose length is limited by the available space left in the maximum depressed position of the shockabsorber.

In the course of a depression of the rod into the body of the shockabsorber, the free edge of the tube of elastomer comes in contact with the cup 10 and this causes, as shown in FIG. 2, a deformation of the tube in the region of the first series of slits 12. The deformation is first produced in this region since the slits are in greater number and are longer than the slits in the region 13. The crushing of the tube results in the formation of a fold which extends outwardly in a region which is located in front of the body of the shockabsorber so that the opening of the slits results in no inconvenience, since it does not occur in front of an uncovered part of the rod.

If the depression of this rod continues, the tube is deformed in the region of the second series of slits, here again in a region in which the rod is protected either by the body of the shockabsorber or by the gaiter 7.

In a simpler embodiment, the protector tube may have only a single series of slits 15 as shown in FIG. 4.

It is clear from the foregoing that the device according to the invention provides an effective solution to the problem presented, since it ensures an excellent protection of the rod of the shockabsorber without hindering the relative movements of the rod and body. The device is moreover very simple to make and place in position and is of particularly low cost.

It will be understood that such a device may be employed in other like applications.

Having now described our invention what we claim as new and desire to secure by Letters Patent is:

1. In a unit comprising a structure and a slidable member which is coaxial with said structure and has a first portion axially slidably mounted in said structure and a second portion extending axially out of a first end of said structure, the slidable member and said structure normally undergoing relative axial reciprocating motion, such as a rod and a body of a shockabsorber, and means for shielding said second portion of the slidable member from projections of undesirable foreign bodies; the improvement wherein said shielding means comprise a flexible substantially elastomeric tube substantially coaxial with and fixed to the slidable member adjacent a first end of the tube, the tube axially extending from said first end of the tube alongside said second portion of the slidable member and beyond said first end of said structure and alongside at least a portion of said structure in all relative axial positions of the slidable member and said structure, and terminating in a free end edge which is capable of encountering a part of said structure axially remote from said first end of said structure and causing an axial crushing of the tube when the slidable member penetrates said structure in excess of a given extent, the tube comprising in a region of the length of the tube adjacent said free end edge at least one series of throughway slits which are spaced apart around the periphery of the tube and extend in a direction substantially parallel to the generatrices of the tube, the axial distance between said first end of said structure and said part of said structure being such that when said free end edge of the tube encounters said part of said structure said slits do not surround said second portion of the slidable member but surround said structure.

2. A unit as claimed in claim 1, wherein the flexible tube comprises two series of slits which are offset from each other axially of the tube.

3. A unit as claimed in claim 2, wherein the series of slits which is the nearest to said free edge of the flexible tube comprises more slits than the other series.

4. A unit as claimed in claim 2, wherein the slits of the series which is the nearest to said free edge of the tube are longer than the slits of the other series.

5. A unit as claimed in any one of the claims 1 or 2 to 4, wherein the slits are formed by cuts in the tube which cuts have adjoining lips.

6. A unit as claimed in any one of the claims 1 or 2 to 4, wherein the slits of one series are located between two planes perpendicular to the axis of the tube.

7. A unit as claimed in any one of the claims 1 or 2 to 4, wherein said slidable member is a rod of a shockabsorber and said structure comprises a body of the shockabsorber in which body the rod is axially slidable, and the flexible tube is fixed to a cup which is rigid with the rod of the shockabsorber.

8. A unit as claimed in claim 7, wherein the flexible tube has an inside diameter which is larger than the outside diameter of the body of the shockabsorber and said free edge comes in contact with means defining a surface which are rigid with the body of the shockabsorber in the course of the relative axial movements of the rod and body of the shockabsorber.

* * * * *